(12) United States Patent
May et al.

(10) Patent No.: US 7,610,216 B1
(45) Date of Patent: Oct. 27, 2009

(54) METHOD AND SYSTEM FOR DETECTING FRAUD

(75) Inventors: Jason W. May, San Jose, CA (US); Ian Flint, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 09/615,638

(22) Filed: Jul. 13, 2000

(51) Int. Cl.
G06Q 20/00 (2006.01)
G06Q 40/00 (2006.01)

(52) U.S. Cl. ............................. 705/18; 705/44; 705/75

(58) Field of Classification Search ................. 705/1, 705/41, 44, 26, 27, 34, 38, 39, 40, 42, 75
See application file for complete search history.

(56) References Cited

U.S. PATENT DOCUMENTS

| | | | |
|---|---|---|---|
| 3,687,256 A | 8/1972 | Jones | |
| 4,789,928 A | 12/1988 | Fujisaki | |
| 4,903,201 A | 2/1990 | Wagner | |
| 4,992,940 A | 2/1991 | Dworkin | |
| 5,280,305 A | 1/1994 | Monroe | |
| 5,283,731 A | 2/1994 | Lalonde et al. | |
| 5,285,383 A | 2/1994 | Lindsey et al. | |
| 5,329,589 A | 7/1994 | Fraser et al. | |
| 5,335,170 A | 8/1994 | Petteruti et al. | |
| 5,345,091 A | 9/1994 | Craig | |
| 5,383,113 A | 1/1995 | Kight et al. | |
| 5,402,336 A | 3/1995 | Spiegelhoff et al. | |
| 5,424,944 A | 6/1995 | Kelly | |
| 5,453,926 A | 9/1995 | Stroschin et al. | |
| 5,521,815 A | 5/1996 | Rose, Jr. | |
| 5,526,479 A | 6/1996 | Barstow et al. | |

(Continued)

OTHER PUBLICATIONS

Bank Systems & Technology article entitled, "MasterCard sharpens aim at global card fraud", Oct. 1998.*

(Continued)

*Primary Examiner*—F. Ryan Zeender
*Assistant Examiner*—Faris Almatrahi
(74) *Attorney, Agent, or Firm*—Schwegman, Lundberg & Woessner, P.A.

(57) ABSTRACT

A system and method for detecting fraud when facilitating a payment transaction over a global wide area network. The method comprises receiving a sale information, receiving a payment information from a buyer, and analyzing a transaction information for fraud. If the analyzing indicates fraud, an enhanced transaction information is communicated to a human for fraud analysis. In one embodiment, the method comprises performing rule-based analyses to determine whether the transaction appears to be fraudulent. Rule-based analyses may include suspect data rules and velocity rules. Velocity rules generally determine whether there has been excessive activity that may lead to a conclusion that the transaction may be fraudulent. Suspect data rules are used to determine whether the billing, shipping, selling addresses, telephone numbers, and account numbers, and other data are in a syntactically correct format and whether they exist. In one embodiment, the method further comprises performing simple screening of the transaction information. In one embodiment, the method further comprises seeking approval from a third party such as a financial institution based on the payment information. The method may be implemented as part of a system that includes personal computers, server computers, and other personal computing devices, some of which may communicate over the Internet, and others which may communicate via dedicated communication lines.

38 Claims, 4 Drawing Sheets

U.S. PATENT DOCUMENTS

| | | | | |
|---|---|---|---|---|
| 5,592,375 | A | 1/1997 | Salmon et al. | |
| 5,664,111 | A | 9/1997 | Nahan et al. | |
| 5,675,784 | A | 10/1997 | Maxwell et al. | |
| 5,677,955 | A * | 10/1997 | Doggett et al. | 705/39 |
| 5,708,780 | A | 1/1998 | Levergood et al. | |
| 5,715,314 | A | 2/1998 | Payne et al. | |
| 5,732,400 | A * | 3/1998 | Mandler et al. | 705/26 |
| 5,757,917 | A | 5/1998 | Rose et al. | |
| 5,790,790 | A | 8/1998 | Smith et al. | |
| 5,794,207 | A | 8/1998 | Walker et al. | |
| 5,799,285 | A | 8/1998 | Klingman | |
| 5,803,500 | A | 9/1998 | Mossberg | |
| 5,819,226 | A * | 10/1998 | Gopinathan et al. | 705/44 |
| 5,822,737 | A | 10/1998 | Ogram | |
| 5,826,241 | A | 10/1998 | Stein et al. | |
| 5,826,244 | A | 10/1998 | Huberman | |
| 5,873,069 | A | 2/1999 | Reuhl et al. | |
| 5,878,138 | A * | 3/1999 | Yacobi | 705/44 X |
| 5,884,289 | A * | 3/1999 | Anderson et al. | 705/44 |
| 5,913,040 | A | 6/1999 | Rakavy et al. | |
| 5,963,917 | A | 10/1999 | Ogram | |
| 6,047,264 | A | 4/2000 | Fisher et al. | |
| 6,049,785 | A | 4/2000 | Gifford | |
| 6,061,448 | A | 5/2000 | Smith et al. | |
| 6,085,176 | A | 7/2000 | Woolston | |
| 6,094,643 | A * | 7/2000 | Anderson et al. | 705/44 |
| 6,108,642 | A * | 8/2000 | Findley | 705/44 |
| 6,119,137 | A | 9/2000 | Smith et al. | |
| 6,163,604 | A * | 12/2000 | Baulier et al. | 379/189 |
| 6,178,408 | B1 | 1/2001 | Copple et al. | |
| 6,192,407 | B1 | 2/2001 | Smith et al. | |
| 6,202,051 | B1 | 3/2001 | Woolston | |
| 6,243,691 | B1 | 6/2001 | Fisher et al. | |
| 6,246,996 | B1 * | 6/2001 | Stein et al. | 705/39 X |
| 6,254,000 | B1 * | 7/2001 | Degen et al. | 705/44 |
| 6,853,987 | B1 * | 2/2005 | Cook | 705/75 |
| 2001/0039535 | A1 * | 11/2001 | Tsiounis et al. | 705/71 |
| 2002/0099649 | A1 * | 7/2002 | Lee et al. | 705/38 |

OTHER PUBLICATIONS

Business Editors/Computer Writer, "ONSALE: ONSALE Brings Thrill of Auctions and Bargain Hunting Online; Unique Internet retail service debuts with week-long charity auction for The Computer Museum in Boston", *Business Wire*, (May 24, 1995),3 pages.

Meade, Jim, "Visual 360: A Performance Appraisal System That's 'Fun'", *HR Magazine*, (Jul. 1999),1-3.

Priest, Chris et al., "Adaptive Agents in a persistent shout double auction", *International conference on Information and Computation Economies, Proceedings of the first international conference on Information and computation economies*, Oct. 25-28, 1998, (1998),11-18.

Resnick, Paul et al., "Reputation systems", *Communications of the ACM*, 43(12), (Dec. 2000),45-48.

U.S. Appl. No. 09/615,638, Advisory Action mailed Aug. 25, 2006, 3 pgs.

U.S. Appl. No. 09/615,638, Final Office Action mailed Jun. 7, 2006, 8 pgs.

U.S. Appl. No. 09/615,638, Non Final Office Action mailed Oct. 6, 2005, 6 pgs.

U.S. Appl. No. 09/615,638, Non Final Office Action mailed Aug. 26, 2004, 6 pgs.

* cited by examiner

METHOD AND SYSTEM FOR DETECTING FRAUD

FIELD OF THE INVENTION

The invention relates to detecting fraud in a networked system that facilitates a payment transaction between two parties. More specifically, the invention relates to a system and method for detecting fraud in which an Internet web site serves as a payment facilitator when a first party wishes to pay a second party for goods, services, etc.

BACKGROUND

Traditionally, classified advertisements and other newspaper, specialty paper, and magazine advertisements and listings provide a way for a seller of goods or services to advertise in an attempt to obtain a buyer for the goods or services. However, when a transaction is agreed upon, the buyer and seller enter an awkward time, particularly when the transaction takes place across a great geographical distance. The persons and smaller businesses taking advantage of classified advertisements and similar listings do not typically accept payment by credit card or bank debit card. Checks and money orders are generally used. The buyer may send a check or money order by letter to the seller, and the seller may either simultaneously with the sending of the funds or upon receipt of the funds, send the goods to the buyer. The buyer and seller must trust one another. Each runs the risk of encountering a swindle and being the victim of fraud. The same applies when services are purchased over a great distance. In addition, there is a delay in the buyer receiving the goods or services when the seller waits for a check to be mailed and then clear before shipping the item or activating the service.

On-line sale facilitating systems have given new life to person to person long distance sale of goods and services. Rather than selling via local magazines, specialty papers, and newspaper classifieds and listings, persons are using on-line sale facilitating systems to sell locally, nationally and internationally via the Internet.

The Internet and personal computers have become ubiquitous in modern society. Although the Internet has existed in various forms for many years, the Internet became popular as a mass communication vehicle with the introduction of the world wide web. The world wide web is, from the user's perspective, a way of easily identifying a remote computer, connecting to the remote computer, and viewing information stored on the remote computer. Remote computers that provide a vehicle for the sale of goods and services have become very popular. These systems are referred to herein as sale facilitating systems. EBAY® is an example of a sale facilitating system. However, even with this new technology, buyers and sellers must still trust one another as each still runs the risk of encountering a swindle and being the victim of fraud while funds and goods are exchanged by mail.

While using the Internet, hidden from the user are the various communications protocols that make the Internet function. Various committees and ad hoc groups known as working groups coordinate and control the Internet. The Internet Engineering Task Force (IETF) is the protocol engineering and development arm of the Internet. Working groups under the IETF determine the rules and protocols for the underlying functionality of the Internet and publish them as requests for comment, commonly referred to as RFCs. Each working group makes its RFCs available via the Internet at various web sites. Information is communicated over the Internet via the transmission control protocol/Internet protocol (TCP/IP) and hypertext transfer protocol (HTTP). Many personal computers utilize the point to point protocol (PPP) to communicate with an internet service provider to obtain a link to the Internet. More information is available from T. Socolofsky and C. Kale, *A TCP/IP Tutorial*, RFC 1180, January 1991, http://www.ietf.org/rfc/rfc1180.txt; R. Fielding et al., *Hypertext Transfer Protocol—HTTP/1.1*, RFC 2616, June 1999 (Draft Standard), http://www.ietf.org/rfc/rfc2616.txt; and W. Simpson, Editor, *The Point-to-Point Protocol*, RFC 1661, http://www.ietf.org/rfc/rfc1661.txt.

To make on-line and off-line purchases easier, payment facilitators that allow buyers to purchase from sellers via credit cards and debit cards eliminate the uneasiness of long distance purchases originating from traditional classified advertisements, on-line classified advertisement, on-line sale facilitating systems such as EBAY®, and others. To make their service safe and secure, payment facilitators should check for potential fraudulent transactions when processing payment transactions.

BRIEF SUMMARY OF THE INVENTION

A system and method for detecting fraud when facilitating a payment transaction over a global wide area network. The method comprises receiving a sale information, receiving a payment information from a buyer, and analyzing a transaction information for fraud. If the analyzing indicates fraud, an enhanced transaction information is communicated to a human for fraud analysis. In one embodiment, the method comprises performing rule-based analyses to determine whether the transaction appears to be fraudulent. Rule-based analyses may include suspect data rules and velocity rules. Velocity rules generally determine whether there has been excessive activity that may lead to a conclusion that the transaction may be fraudulent. Suspect data rules are used to determine whether the billing, shipping, selling addresses, telephone numbers, and account numbers, and other data are in a syntactically correct format and whether they exist. In one embodiment, the method further comprises performing simple screening of the transaction information. In one embodiment, the method further comprises seeking approval from a third party such as a financial institution based on the payment information. The method may be implemented as part of a system that includes personal computers, server computers, and other personal computing devices, some of which may communicate over the Internet, and others which may communicate via dedicated communication lines.

DETAILED DESCRIPTION

Figure 1:
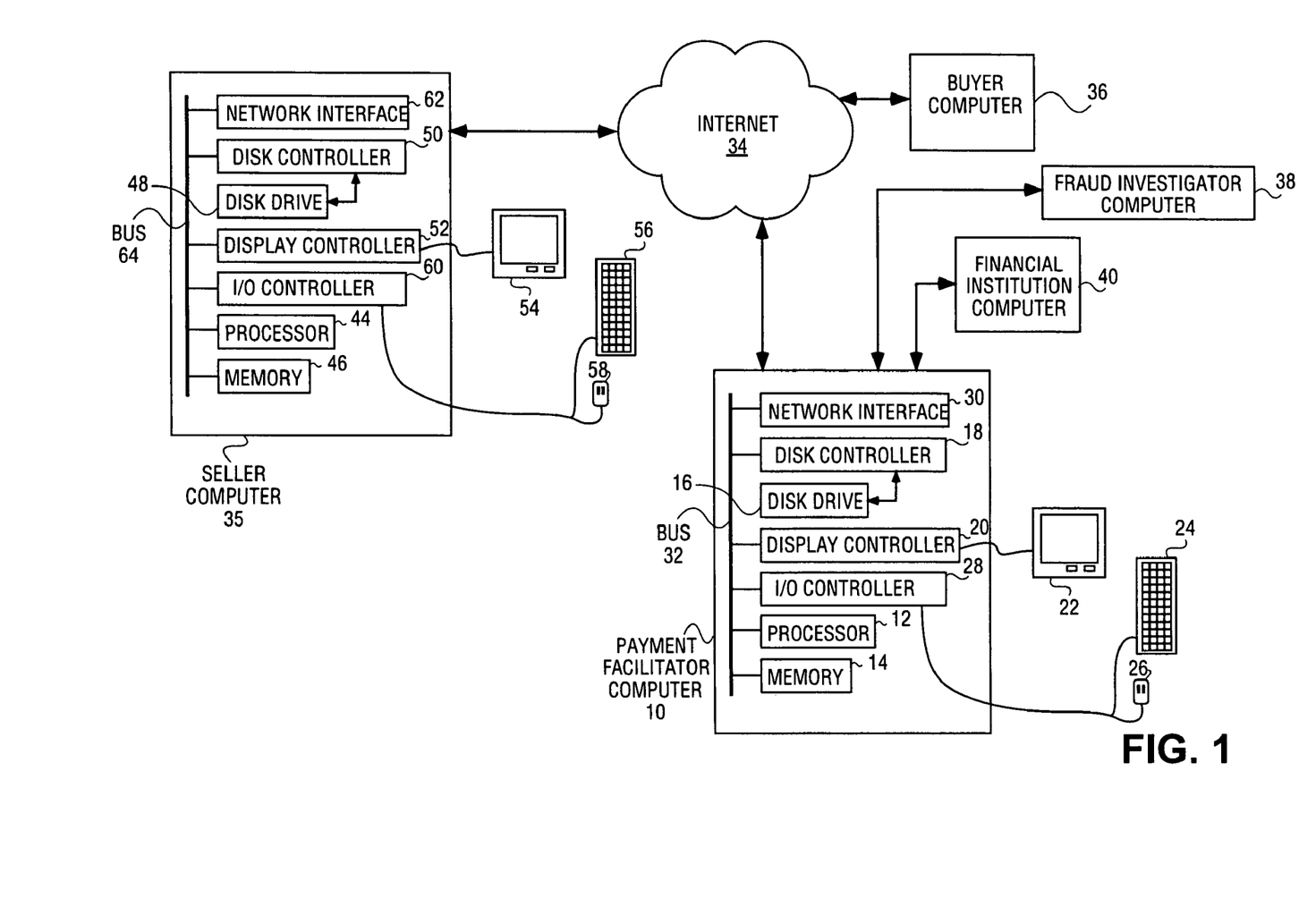
FIG. 1 depicts a networked environment in which the fraud detection method and system of the present invention may be implemented.

FIG. 1 depicts a networked environment in which the fraud detection method and system of the present invention may be implemented. In this embodiment, the method is implemented as software stored in and executed by a server computer such as payment facilitator computer 10. Payment facilitator computer 10 may be any server computer that can execute software programs and access a global communications network such as the Internet. In one embodiment, payment facilitator computer 10 comprises processor 12 and memory 14. Processor 12 may be any computer processor, and memory 14 may be any random access memory (RAM) or other readable and writeable memory device.

The method and system for detecting fraud in a networked system that facilitates a payment transaction between two parties is referred to, for ease of reference, as fraud detection software and the fraud detection system. Processor 12 executes the fraud detection software utilizing memory 14. Information, including the fraud detection software, is read from and written to disk drive 16 which is coupled to the payment facilitator computer via disk controller 18. Disk drive 16 may be a hard disk drive, a readable and writeable compact disk (CDRW) drive, a floppy disk drive, etc. In addition, disk drive 16 may be any device by which a machine may read from a machine readable medium such as the devices already mentioned, as well as, but not limited to, a stick or card memory device, a digital audio tape (DAT) reader, etc. The processor may communicate instructions to display controller 20 to display images on display device 22. Display controller 20 may be any display controller, and display device 22 may be any display monitor, including, but not limited to, a CRT display monitor, or TFT display screen. A system administrator or other similar person accesses payment facilitator computer 10 via any computer input device, such as, for example, keyboard 24 and mouse 26 which are coupled to the processor by I/O controller 28.

Payment facilitator computer 10 also includes network interface 30. In this embodiment, the payment facilitator computer 10 communicates with a wide area network, or, in one embodiment, the Internet 34. Network interface 30 may be an analog modem, a digital modem, a cable modem, an Ethernet card, or any other kind of network access device that allows for connection to the Internet 34 via an analog telephone line, digital subscriber line (DSL), cable television line, T1 line, or any other line capable of communicating information over a network. Processor 12, memory 14, disk controller 18, display controller 20, I/O controller 28, and network interface 30, are coupled to one another via and communicate with one another over bus 32. Bus 32 may be any bus that provides for communication of and between components within a computer. Although only one bus is depicted, multiple buses may be used in personal computer 10. In addition, other components and controllers (not depicted) or multiple instances of depicted components and controllers may be included in payment facilitator computer 10. In one embodiment, payment facilitator computer 10 communicates over the Internet via network interface 30 and receives information from and communicates information to devices connected to the Internet such as seller computer 35 and buyer computer 36.

Although only one payment facilitator computer 10 is depicted, a payment facilitator system may be comprised of multiple computers in the form of a local area network (LAN), grouping, subnetwork, etc. (not shown). This payment facilitator system grouping, LAN, subnetwork, etc. may be connected to the Internet or other global communications network, in one embodiment, via one or more firewalls or other security devices and systems so that the payment facilitator computer is separated from the Internet for security purposes. The payment facilitator computer or system may be comprised of graphics servers, application servers and other specialized, dedicated servers (not shown).

In one embodiment, seller computer 35 may be any kind of personal computing device that can execute programs and access a global communications network such as the Internet, including, but not limited to, cellular telephones, personal digital assistants, desktop personal computers, portable computers, computer workstations, etc. In one embodiment, seller computer 35 comprises processor 44, which may be any computer processor, and memory 46, which may be any random access memory (RAM) or other readable and writeable memory device. Software programs, including a web browser and Internet communication and connection software, and other information are stored on disk drive 48 which is coupled to seller computer via disk controller 50. Disk drive 48 may be a hard disk drive, a readable and writeable compact disk (CDRW) drive, a floppy disk drive, etc. and may also be any other kind of storage device, such as, but not limited to, a stick or card memory device, a digital audio tape (DAT) reader, etc. The processor may communicate instructions to display controller 52 to display images on display device 54. Display controller 52 may be any display controller, and display device 54 may be any display monitor, including, but not limited to, a CRT display monitor, or TFT display screen. A user accesses seller computer 35 via any computer input device, such as, for example, keyboard 56 and mouse 58 which are coupled to the processor by I/O controller 60.

Seller computer 35 also includes network interface 62. In one embodiment, the seller computer communicates over the Internet 34 to access payment facilitator computer 10. Network interface 64 may be an analog modem, a digital modem, a cable modem, or any other kind of network access device that allows for connection to the Internet, or other global communications network. Processor 44, memory 46, disk controller 50, display controller 52, I/O controller 60, and network interface 62, are coupled to one another via and communicate with one another over bus 64. In addition, other components and controllers (not depicted) or multiple instances of depicted components and controllers may be included in seller computer 35.

Buyer computer 36 may be any personal computing device such as that described with regard to seller computer 35. Similarly, fraud investigator computer 38 may be any personal computing device such as that described with regard to seller computer 35. In addition, financial institution computer 40 may be any computer such as that described with regard to payment facilitator computer 10. Although referred to herein as financial institution computer 40, the financial institution may be a traditional financial institution such as a bank, savings and loan, or credit union, and may also be a clearinghouse for credit card transactions, electronic check transactions, debit card transactions, etc.

In one embodiment, payment facilitator computer 10 communicates over the Internet via network interface 30 and receives information from and communicates information to other computers and personal computing devices connected to the Internet such as seller computer 35 and buyer computer 36. Although only one each of buyer computer 36 and seller computer 35 are depicted, multiple buyers and sellers with personal computing devices may utilize the services provided by the fraud detection software executing on payment facilitator computer 10 by communicating over the Internet. Communications by buyer and seller personal computing devices via the Internet may be accomplished by land line, wireless or other methods of communication.

In one embodiment, fraud investigator computer 38 and financial institution computer 40 do not connect with payment facilitator computer 10 via the Internet. Rather, in one embodiment, a dedicated line such a DSL line, T1 line, etc. connect financial institution computer 40 with payment facilitator computer 10. In another embodiment, a secure wireless connection may be used between financial institution computer 40 with payment facilitator computer 10. In one embodiment, fraud investigator computer 38 is connected to payment facilitator computer outside of the Internet or other global communications network in a private LAN. In another embodiment, there may be multiple instances of fraud investigator computers and financial institution computers, although only one of each is depicted. Fraud investigators may communicate by email with buyers and sellers. In one embodiment, all email communication involving the fraud investigator computers is routed through the payment facilitator computer, payment facilitator system, and/or, in other embodiments, is routed through the payment facilitator grouping, firewalls, LAN, etc.

Figure 2:
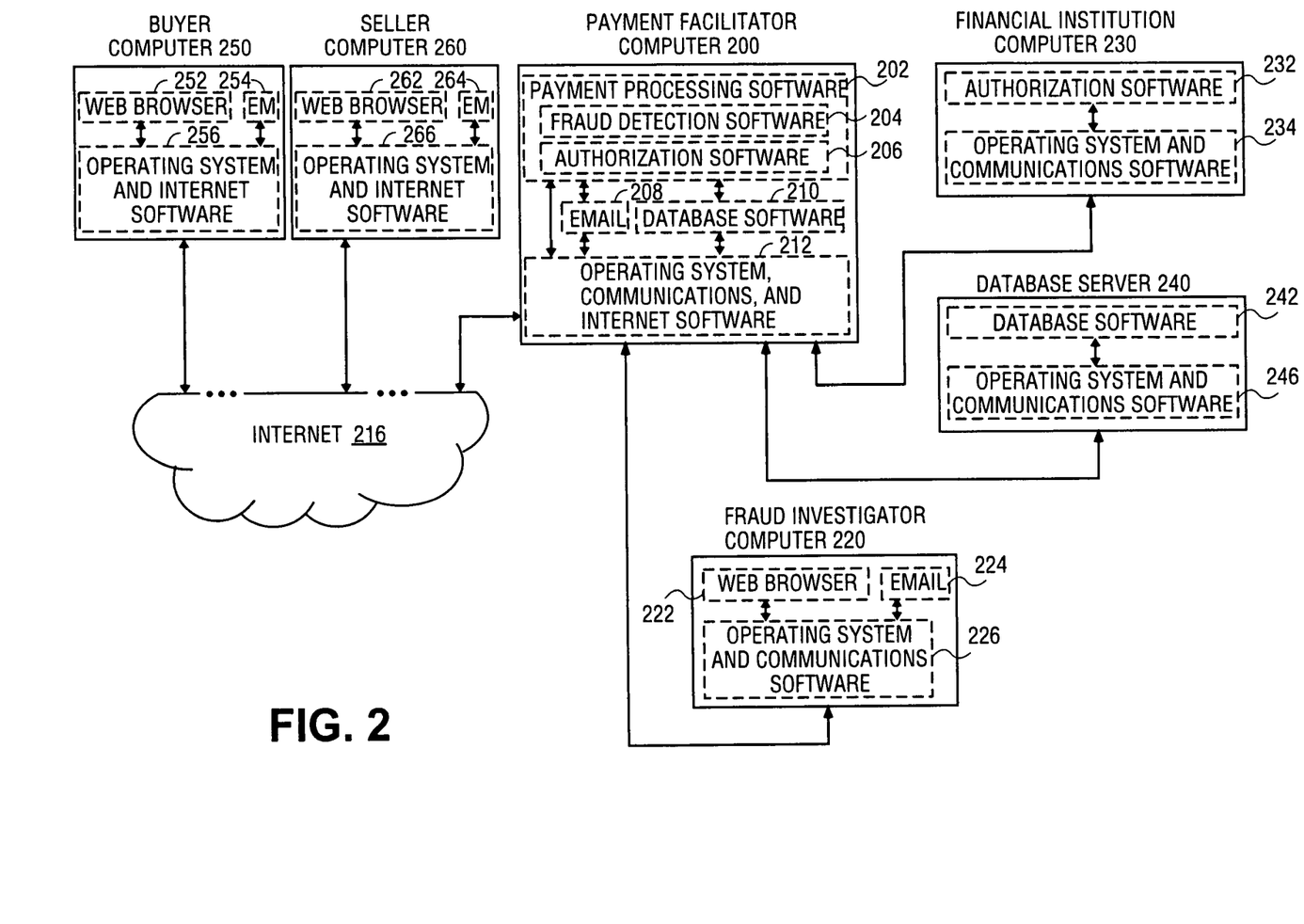
FIG. 2 depicts a software architecture and software components of one embodiment of the fraud detection method and system of the present invention.

FIG. 2 depicts a software architecture and software components of one embodiment of the fraud detection method and system of the present invention. Payment facilitator computer 200 includes payment processing software 202. In one embodiment, fraud detection software 204 is implemented as a component of payment processing software 202. Authorization software 206 is also implemented, in one embodiment, as part of payment processing software 202. In another embodiment, authorization software 206 may be implemented as part of fraud detection software 204. Payment facilitator computer 200 includes email software 208 that allows payment processing software 202 to send and receive email messages.

Operating system, communications software and Internet software, collectively 212, provide file system support, Internet connectivity support, computer communications support, and other typical operating systems features. The operating system, communications software and the Internet software 212 may be combined as one entity as depicted, or may exist separate from one another. In one embodiment, payment processing software 202 accesses the Internet and communicates with buyer computers such as buyer computer 250 and seller computers such as seller computer 260 with the Internet software. In this embodiment, payment processing software 202 accesses the local file system and local system resources via the operating system, and accesses fraud investigator computer 220 and financial institution computer 230 via the communications software. In one embodiment, the communications software provides support for communications over any dedicated computer communication line.

Fraud investigator computer 220 includes web browser 222, email software 224, and operating system and communications software 226. The operating system and communications software may be combined as one entity as depicted, or may exist separately. Upon determining that a payment transaction may involve fraud, in one embodiment, fraud detection software 204 sends an email message via email software 208 and communications software to a human fraud investigator at fraud investigator computer 224 over a dedicated communications connection such as an Ethernet cable, T1 line, or wirelessly. The fraud investigator retrieves the email message using email software 224. In another embodiment, the fraud investigator computer is capable of communication over the Internet such that the fraud notification email message may be sent to the fraud investigator via the Internet. In yet another embodiment, payment facilitator computer 200 and fraud investigator computer 220 may include instant messaging software (not shown) so that an instant message is sent by the fraud detection software upon determining that a payment transaction may include fraud. In another embodiment, multiple fraud investigators may communicate with the payment facilitator computer over a LAN or other private network. In this embodiment, email messages or instant messages may be sent via the LAN. In addition, fraud investigators may communicate via email messages with buyers and sellers. In one embodiment, the fraud investigator's email messages are sent over the Internet through payment facilitator computer 200. In other embodiments, email from the fraud investigators is routed through the payment facilitator LAN, grouping, etc.

In one embodiment, financial institution computer 230 includes authorization software 232 and operating system and communication software, combined as 234. In this embodiment, authorization software 206 of payment processing software 202 may seek authorization of a payment transaction by communicating over a direct connection to financial institution computer 230. Financial institution computer 230 may be a clearinghouse for credit card and/or debit card transactions or serve only one financial institution. Companies that provides authorization services are, for example, Paymentech of Dallas, Tex. and First Data Merchant Services (FDMS) of Englewood, Colo. Upon receiving a request for authorization of a payment transaction via operating system and communications software 234, authorization software 232 processes the request and returns a response. Although only one financial institution computer is depicted, in another embodiment, the payment facilitator computer or payment facilitator system may communicate with multiple financial institution computers. In one embodiment, the payment facilitator computer communicates with financial institution computer(s) over a direct line rather than over the Internet for security and surety of connectivity. In another embodiment, the payment facilitator computer may communicate with financial institution computers via the Internet. In yet another embodiment, the payment facilitator computer may communicate with the financial institution computer(s) via a secure wireless connection.

In one embodiment, fraud detection software 204 accesses information about the transaction history of buyers and sellers, reviews blacklists and stores and obtains other pertinent data by communicating with database software 210 and accessing one or more databases stored on payment facilitator computer 200. Database software 210 may provide support for any well known database system that implements, in one embodiment, structured query language (SQL), or any other well known database languages. In another embodiment, fraud detection software 204 communicates with database software 210 which accesses database server 240 via Java Database Connectivity (JDBC) and/or the Open Database Connectivity (ODBC) application programming interfaces to access database software 242 to store and obtain pertinent information. Database server 240 includes operating system and communications software 246. Database software 242 may provide support for any well known database system that implements, in one embodiment, SQL, or any other well known database languages. In another embodiment, fraud detection software 204 may check for fraud by issuing queries regarding information provided by the buyers and sellers, checking blacklists of various information included with the transaction data, checking with external credit bureaus, etc. by communicating with one or more third party database servers, one or more third party blacklist servers, one or more external credit bureaus, etc. In one embodiment, financial institution computer 230 may also serve as a third party database server, third party blacklist server, external credit bureau, etc.

Buyer computer 250 and seller computer 260 may each communicate with payment facilitator computer 200 over the Internet 216, or other wide area network. Users of the payment facilitator system represented by payment processing software 202 on payment facilitator computer 200 communicate with payment facilitator computer 200 via web browsers 252 and 262 on buyer computer 250 and seller computer 260. Web browsers 252 and 262 access the Internet 216 and access local file system and local system resources via operating system and Internet software 256 and 266. The Internet software provides support for TCP/IP, PPP and other network communications protocols. The web browsers support communication via HTTP and other application level protocols. An example of a web browser is Netscape Navigator available from Netscape Communications of Mountain View, Calif.

Figure 3:
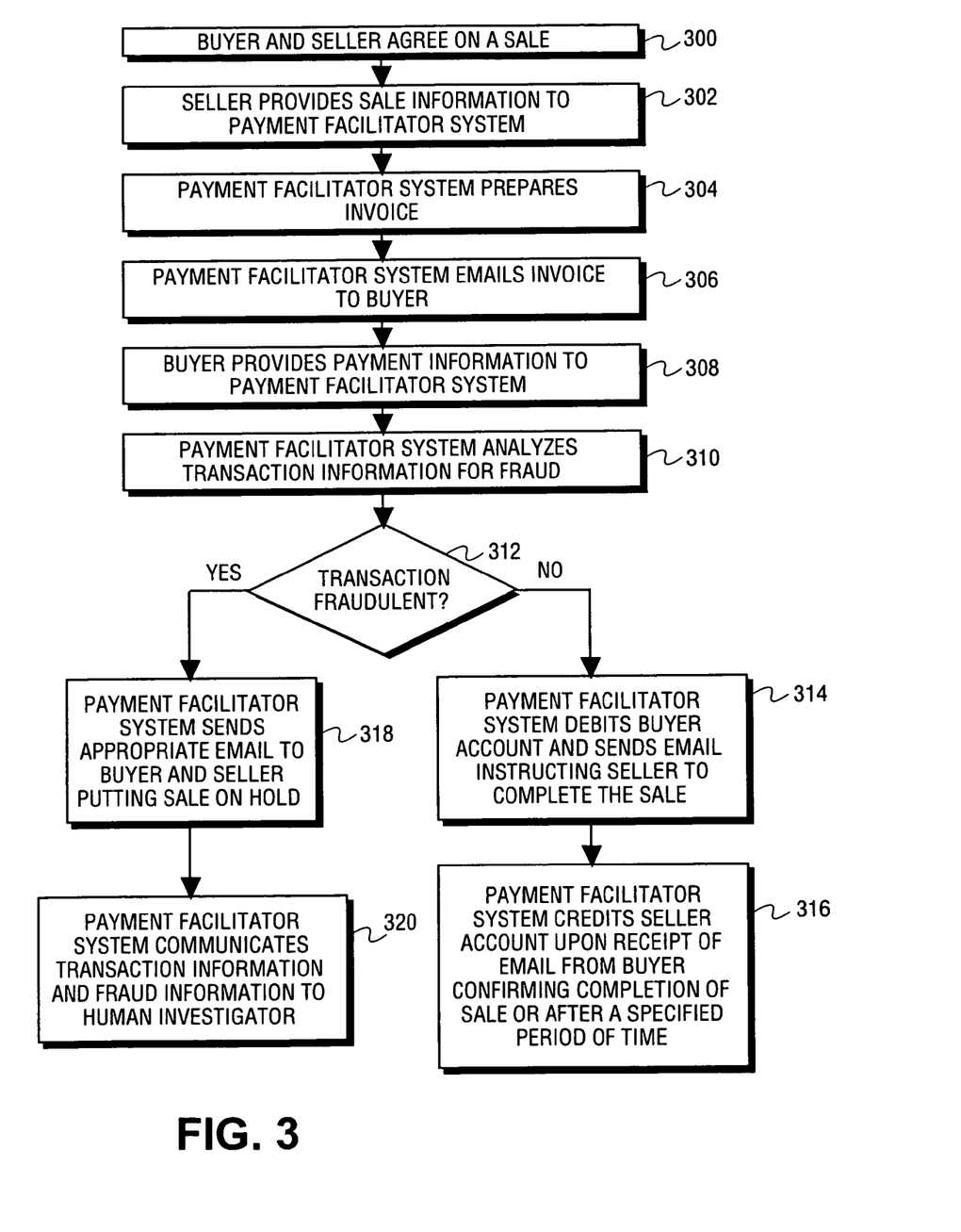
FIG. 3 depicts a general flow of actions taken according to one embodiment of the fraud detection method and system of the present invention.

FIG. 3 depicts a general flow of actions taken according to one embodiment of the fraud detection method and system of the present invention. After a buyer and seller agree to participate in a sale of goods or services, as shown in block 300, the seller provides sale information to the payment facilitator system, as shown in block 302. In one embodiment, the seller provides at least a sale price for the good(s), a description of the goods, the email address of the buyer, and an identifier of the buyer such as a name, and may also provide a detailed description of the good(s), information about the buyer such as the buyer's name, email address, billing address, shipping address, etc. In one embodiment, the sale information may also include seller information such as the bank account, credit card account, or other account which will be credited upon completion of the sale. In another embodiment, the seller may provide seller information prior to providing the sale information, such as when creating a seller's account with the payment facilitator system. In one embodiment, the seller's internet protocol (IP) address is saved and stored with the seller information and/or with the transaction information. The IP address may be gleaned from examination of incoming packets of data from the seller when the seller is communicating with the payment facilitator system.

In one embodiment, the sale information and the seller information are provided by the seller by communicating to the payment facilitator system via a web site interface provided to the seller by the payment facilitator system. In one embodiment, the payment facilitator system provides for the communication of programs and data that result in the display of images and information on a seller's display screen. For example, the payment facilitator system may package JAVA® applets and hyper-text markup language (HTML) code that is communicated via HTTP over TCP/IP with the user. The user interface provided by the payment facilitator system may include well known user interface items such as icons, text data entry fields, menus, buttons, sliders, and the like. In one embodiment, dates, credit card issuers, banks, etc. may be provided as items in menus accessible via any well known method. In this way, the amount of text required to be entered by a user is minimized, and the ease of use of the system is enhanced. In one embodiment, the communications between the seller computer and the payment facilitator computer are made secure by use of encryption and security techniques such as secure HTTP, secured sockets layer (SSL) encryption, and/or the transport layer security (TLS) protocol. More information on SSL is available from Netscape Communications of Mountain View, Calif. and additional information concerning TLS is available in E. Rescorla, *HTTP Over TLS*, RFC 2818, http://www.ietf.org/rfc/rfc2818.txt, May 2000.

In one embodiment, the negotiations and agreement to sell may have occurred on a computer system via a sale facilitating system such as EBAY®. In this embodiment, the sale information may be provided via a direct communications link to the sale facilitating system. In another embodiment, the sale negotiations and agreement between the buyer and seller may have occurred by mailed correspondence or by telephone, and may have been initiated by viewing an offering of goods or services for sale by a classified advertisement on-line, classified advertisement or listing in a newspaper, specialty paper, or magazine, or by any other method that connects buyers with sellers. In this embodiment, the buyer and seller agree to use the payment facilitator system, and the seller then begins the payment transaction process by connecting to the payment facilitator web site.

After receiving the sale information, the payment facilitator system prepares an invoice and emails the invoice to the buyer, as shown in blocks 304 and 306. In one embodiment, the invoice includes at least a description of the goods or services the buyer agreed to purchase and the sale price, and may include further information such as the seller's contact information, namely the seller's email address, mailing address, telephone number, etc. In another embodiment, the payment facilitator may prepare an invoice, and email a notification to the buyer that an invoice is ready for retrieval at a specified location within the payment facilitator web site such as at a specified uniform resource locator (URL) or uniform resource identifier (URI). In response to receiving or viewing the invoice, the buyer then communicates with the payment facilitator web site, and the buyer provides payment information to the payment facilitator system, as shown in block 308. In one embodiment, the payment information includes a billing address information, a shipping address information, and a financial account information. The financial account information must include one of a credit card account number, a debit card account number, a bank account number, etc. and may include related information such as an expiration date, an issuing institution name and address, etc. The billing and shipping address information may include the name of a person, street address, city, state, zip code, and day and night telephone numbers. The payment information may also include the buyer's email address, screen name, account name, or other identifier and identifying information. In one embodiment, the buyer's IP address is saved and stored with the payment information and/or with the transaction information. The IP address may be gleaned from examination of incoming packets of data from the buyer when the buyer is communicating with the payment facilitator system.

Upon receipt of the transaction information, the payment facilitator system analyzes the transaction information for fraud, as shown in block 310. How this is achieved is discussed in more detail below with regard to FIG. 4. A check is then made to determine whether the transaction appears to be fraudulent, as shown in block 312. If the transaction does not appear to be fraudulent, the payment facilitator system debits the buyer's account and sends an email message instructing the seller to complete the sale, as shown in block 314. In response to such an email message, the seller then sends the good(s) to the buyer in an agreed-upon manner. In one embodiment, the payment facilitator system then credits the seller's financial account upon receipt of an email note from the buyer confirming completion of the sale or after a specified period of time, as shown in block 316. In this embodiment, the seller's account is credited when the buyer confirms that the good(s) have been received. Alternatively, in this embodiment, if the buyer fails to confirm receipt of the good(s) and does not inform the payment facilitator system that the good(s) were not received, the seller's account is credited for the sale. In another embodiment, the payment facilitator system may send an email message to the buyer asking the buyer to confirm receipt of the goods. This message could also state that if no response to the email message is received, the buyer's account will be debited and/or the seller's account will be credited if no response is receive within a specified period of time.

If the transaction appears to be fraudulent, as shown in block 312, the payment facilitator system sends appropriate email messages to the buyer and/or the seller, putting the sale on hold, as shown in block 318. The payment facilitator system then communicates information about the payment transaction and fraud information to a human investigator, as shown in block 320. The human investigator then investigates the transaction, starting with the fraud information provided as a result of the earlier fraud analysis, to determine whether the transaction is fraudulent or appears to have a high possibility of being fraudulent. The fraud investigator then takes whatever action the fraud investigator deems appropriate, such as communicating with the buyer and/or the seller by email or telephone, contacting local police authorities, contacting the FBI, etc. The fraud investigator may cancel or allow the sale based on the results of the investigation. If the investigator allows the transaction, actions according to blocks 314 and 316 discussed above are then executed.

In one embodiment, after the buyer and seller agree on a sale, the sale information may be communicated to the payment facilitator system by the buyer. In this embodiment, the seller may have already registered with the system, and the buyer provides pertinent sale information to the payment facilitator system. This sale information may include the payment information regarding the buyer as discussed above regarding block 308, as well as specific information identifying the sale transaction such as a description of the goods or services the buyer agreed to purchase and the sale price, and may include further information such as the seller's contact information, namely the seller's email address, mailing address, telephone number, etc. The payment facilitator system then sends an email sale confirmation request to the seller. In various embodiments, the seller may respond to the email to accept the sale transaction, or the seller may accept the sale transaction by communicating with the payment facilitator system via an internet web interface either independently or by following a URI or URL contained in the email sale confirmation request. In another embodiment, no email sale confirmation request, and the payment facilitator system provides a screen notification to the seller the next time the seller logs on to the sale facilitator system. The screen notification may be a text display or an iconic display, or any other user interface technique. The flow of actions then continues with block 310 as discussed above.

Figure 4:
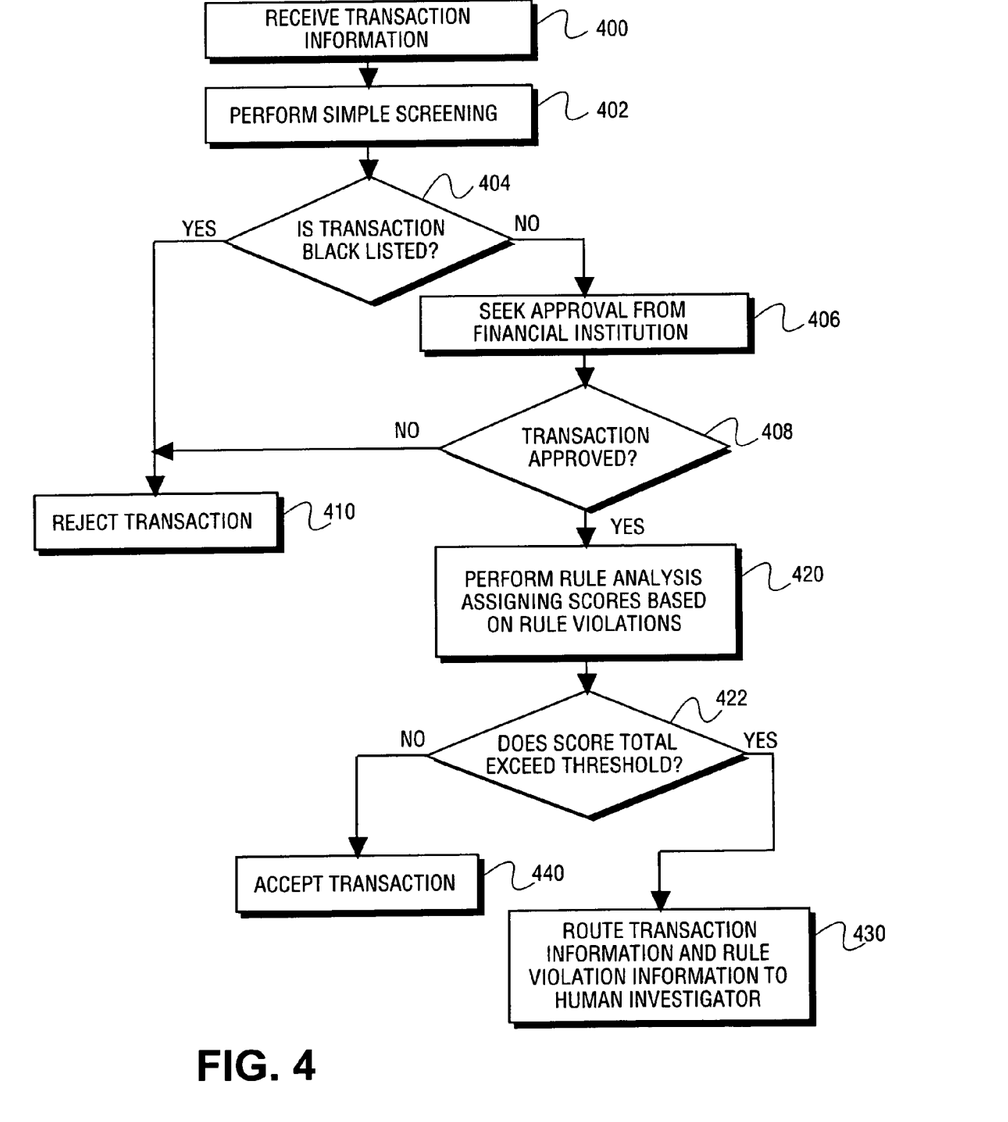
FIG. 4 depicts a more detailed flow of actions taken according to one embodiment of the fraud detection method and system of the present invention.

FIG. 4 depicts a more detailed flow of actions taken according to one embodiment of the fraud detection method and system of the present invention. Fraud detection software receives transaction information from the payment facilitator system, as shown in block 400. The transaction information may include information about the seller such as the seller's contact information, namely email address, user name, mailing address, as well as the seller's specified financial account. That is, the financial account to which the sale will eventually be credited when the sale is complete. The transaction information also includes information about the buyer such as the buyer's billing and shipping address information, the buyer's telephone number(s), the buyer's email address, the buyer's user name, the financial account the buyer has selected to use to pay for the transaction. In addition, the transaction information also includes the price of the good(s) and a description of the good(s). After the fraud detection software receives the transaction information, the fraud detection software performs simple screening, as shown in block 402. Simple screening is the process by which the fraud detection software compares various data contained in the transaction information with lists of financial account numbers, addresses, email addresses, user names, telephone numbers, etc. known to have been used with fraudulent transactions and/or obtained from a third party such as a credit card issuer, bank, or specialized service provider. In another embodiment, the lists or blacklists may be obtained on demand or regularly from a third party such as a bank, credit card issuer, other financial institution or specialized service providers. Such lists include known stolen credit cards and addresses known to have been involved with fraudulent transactions either with any of the payment facilitator system, the sale facilitating system, and any of the many credit card issuers, banks, other financial institutions, specialized service providers, etc. In one embodiment, the simple screening compares the fields for which lists exist with the appropriate list. In this embodiment, if any transaction information is found on any screening list, the transaction is blacklisted.

The fraud detection software then checks whether the transaction is blacklisted, as shown in block 404. If the transaction is not blacklisted, the fraud detection software seeks approval from the financial institution implicated by the financial account specified by the buyer, as shown in block 406. In one embodiment, this involves communicating with a financial institution such as a credit card issuer, bank, etc. computer via a dedicated line to obtain approval for the transaction. The fraud detection software then receives a response from the financial institution and checks to determine whether the transaction is approved, as shown in block 408. In practice, the financial institution or third party that provides financial account approval returns one of a plurality of codes. In one embodiment, the fraud detection software determines whether the code returned should be classified as an approval or rejection. In another embodiment, the fraud detection software may classify the code as a requiring further information and automatically issue email messages to the buyer or seller requesting information clarifying the response from the financial institution. In this embodiment, one example may be for the fraud detection software to automatically send an email message requesting that the buyer confirm the billing address, the buyer's name, or other portion of the transaction information to which the fraud detection software is directed by the error code. Such a recovery system eliminates false positives when a simple typo was made by the user. In one embodiment, if the transaction is blacklisted or if the transaction has not been approved, the fraud detection software rejects the transaction, as shown in block 410. In one embodiment, when a transaction is rejected, appropriate email messages are sent to the buyer and the seller informing them that the payment transaction has been rejected.

If the financial institution approves the transaction, the fraud detection software performs rule-based analysis, assigning a score for the transaction based on rule violation, as shown in block 420. The list of possible rules is endless. Generally, certain information gleaned from the transaction information is compared with other information. This other information may be generally available address look-up information to determine whether the seller's address and the shipping and mailing addresses of the buyer exist, or may be more complex database queries and retrievals of information obtained from the history of transactions that have been processed by the payment facilitator system. In another embodiment, the historical information may also be obtained from a database maintained by a sale facilitating system in addition to or in place of historical information obtained from the payment facilitator system.

Analyses for whether the addresses and other information contained within the transaction information are syntactically correct or whether the addresses or other identifying information exists may be referred to as suspect data rules. Example suspect data rules include the following:

a. is the shipping address a real address?
b. is the shipping address used with multiple different buyers?
c. is the billing address a real addresses?
d. is the billing address used with multiple different buyers?
e. is the shipping address implicated in prior possible fraudulent transactions?
f. does the buyer and/or seller financial account meet the format requirements of the type of account it represents?
g. are the buyer and seller phone numbers real phone numbers?
h. are the seller and shipping addresses the same?

Analyses which require more complex analysis of databases of the payment facilitator system and/or a sale facilitating system may be referred to as velocity rules. Generally, velocity rules check to see if there has been an inordinate amount of activity involving some piece of the transaction information. That is, the rules cause the fraud detection software to determine whether there has been excessive activity that may lead to a conclusion that the transaction may be fraudulent. In one embodiment, velocity rules may involve analysis of transaction volume over a given period of time for the buyer and/or seller, transaction dollar value totals for the buyer and/or seller for a given period of time, etc. In another embodiment, velocity checks may also include analysis of how frequently the specified financial account number or buyer has been declined authorization. In general, determining that there has been excessive activity with one seller may evidence that an innocent seller may be the target of a fraudulent buyer or group of buyers. On the other hand, excessive seller activity may also evidence that the seller is involved in committing a fraud. Although evidence of fraud may exist, it may be difficult to classify whether the fraud was committed by the buyer or by the seller. Therefore, if evidence of fraud appears to be present in a transaction, the transaction is sent to and examined by a fraud investigator so that false positives are minimized.

A more specific example of a velocity rule is determining whether the seller's account has been used beyond some determined threshold during some set period of time. Another example is determining whether the buyer's credit card has been used for a number of transactions exceeding a predetermined acceptable number of daily (or hourly or weekly, etc.) transactions. Further examples of velocity rules follow:

a. does the dollar value of transactions from a single seller exceed $1,000 per financial account per $10,000 worth of transactions on the payment facilitator system?
b. has the buyer's financial account been used with the seller more than 3 times in the past hour?
c. has the buyer's financial account been used with the seller more than 3 times during the last 1000 transactions on the payment facilitator system?
d. has the buyer spent more then $1,000 in 12 hours?
e. has the buyer's financial account been involved with transactions exceeding $1,000 in 12 hours?
f. has the buyer's financial account been involved with more than $10,000 in one month?
g. have the buyer and seller been involved with more than $1,000 of transactions with one another in 12 hours?
h. has the buyer's financial account been used with the seller more than 3 times in the past 100 transactions with the seller?
i. has the shipping address been specified more than 3 times in 12 hours?
j. has the shipping address been specified more than 3 times in the last 100 transactions involving the seller?
k. has the seller's or buyer's IP address been involved with more than 3 transactions in the past 100 transactions on the payment facilitator system?
l. has the buyer's IP address been involved with more than $1,000 transactions in the past 12 hours of transactions on the payment facilitator system?

This list includes just a few of many possible rules. In one embodiment, the dollar amounts and numbers may remain constant and may only be changed by a system operator. In one embodiment, the amounts and thresholds may be automatically adjusted based on the kind of goods sold, the kind of seller, and other variables. The dollar amounts and thresholds listed above are examples and may be any dollar amounts or thresholds that serve as accurate indicators of a possible fraudulent transaction.

In another embodiment, the rule-based analysis may check for fraud by issuing queries regarding information provided by the buyers and sellers, checking blacklists of various information included with the transaction data, checking with external credit bureaus, etc. by communicating with one or more third party database servers, one or more third party blacklist servers, one or more external credit bureaus, etc. in addition to checking the database of the payment facilitator system and the sale facilitating system. In one embodiment, the same financial institution that was consulted to approve the transaction may also serve as a third party database server, third party blacklist server, external credit bureau, etc. with which the rule-based analysis interacts to execute and evaluate rules.

A numerical value is associated with each rule. Each time a rule is found to be violated, the score for the transaction is incremented by the amount associated with the rule. The fraud detection software sets a threshold such that after the rule analyses have been completed, when a score exceeds the threshold, the transaction is considered potentially fraudulent. The numerical values may be weighted according to the particular rule and need not be uniform. In some embodiments, a transaction that violates one velocity rule may cause the threshold to be exceeded, while violating one suspect data rule may not cause the threshold to be exceeded. After the rule analysis is performed, the fraud detection software checks to determine whether the score total exceeds the threshold, as shown in block 422. If the threshold is exceeded, the fraud detection software routes the transaction information and rule violation information to a human investigator, as shown in block 430. In one embodiment, the routing is achieved via email. In one embodiment, the rule violation information may be a code designating which rules were violated, a textual description of the rules violated, or both. The code may be any combination of letters, numbers or symbols that uniquely identifies the rule violated. If the score total does not exceed the threshold, as shown in block 422, the fraud detection software accepts the transaction. With regard to block 312 of FIG. 3, a transaction is considered fraudulent when the score total exceeds the defined threshold as in Block 422 of FIG. 4.

In the foregoing specification, the invention has been described with reference to specific embodiments. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method for detecting fraud by a payment facilitator when facilitating a payment transaction over a global wide area network, the method implemented in a computer-readable storage medium and executed by a server, the method comprising:

receiving, by the payment facilitator via a web site interface associated with the payment facilitator, sale information pertaining to a purchase of a product from a seller, wherein the sale information includes an email address for the seller;

receiving, by the payment facilitator via the web site interface, payment information from a buyer, where the payment information includes an email address for the buyer, and wherein the payment information is received from the buyer in response to an email generated invoice sent to the email address of the buyer or sent in response to an email generated notification of a location that the buyer can acquire the email generated invoice where the location is sent to the email address of the buyer;

performing, by the payment facilitator, automated analysis of transaction information including the sale information and the payment information to detect whether the transaction information indicates fraud, and wherein the payment facilitator executes a software program to process at least some information associated with historical information, in order to determine whether fraud is present;

if the automated analysis does not detect fraud, the payment facilitator sends information via email to the email address of the seller instructing the seller to send the product to the buyer, credits an account of the seller for the purchase in response to an indication that the buyer received the product, and the payment facilitator directly contacts a financial institution associated with the buyer, via a dedicated line, and debits another account associated with the buyer at that financial institution;

when the financial institution requests additional information from the payment facilitator before determining whether fraud exists, the payment facilitator automatically issues email messages to the buyer or the seller requesting information to clarify requests of the financial institution and again attempts to obtain approval from the financial institution with the clarifying information; and if the automated analysis detects fraud, the payment facilitator causes an enhanced transaction information to be communicated to a human for manual fraud analysis.

2. The method of claim 1 wherein the sale information is received from a seller, and the method further comprises:
communicating an invoice to a buyer.

3. The method of claim 1 further comprising:
performing simple screening of the transaction information.

4. The method of claim 3 wherein performing simple screening comprises:
determining whether a financial account specified as part of the payment information is on a list of known fraudulent financial account numbers;
determining whether the name of the buyer or the name of the seller is on a list of known fraudulent users;
determining whether a shipping address specified as part of the payment information is on a list of known fraudulent addresses;
determining whether a billing address specified as part of the payment information is on a list of known fraudulent addresses;
determining whether an email address of the buyer or the seller is on a list of known fraudulent email addresses; and
determining whether an Internet protocol (IP) address of the buyer or the seller is on a list of known fraudulent IP addresses.

5. The method of claim 1 further comprising:
seeking approval from the financial institution based on the payment information.

6. The method of claim 5 wherein seeking approval comprises:
sending a request for approval that comprises at least an account information extracted from the payment information and an amount information to a financial institution;
receiving from the financial institution a response to the request;
rejecting the payment transaction or continuing with the payment transaction responsive to the response.

7. The method of claim 1 wherein performing automated analysis comprises:
performing rule-based analyses.

8. The method of claim 7 wherein performing rule-based analyses comprises:
applying a plurality of rules to the transaction information such that a score for the payment transaction is incremented when one of the rules is violated.

9. The method of claim 8 wherein performing rule-based analyses further comprises:
creating the enhanced transaction information if the score exceeds a predefined threshold such that the enhanced transaction information comprises a tracking number, the score, and a violated rule information.

10. The method of claim 8 wherein applying comprises:
incrementing the score responsive to a numeric value assigned to the rule violated.

11. The method of claim 8 wherein the plurality of rules comprise a plurality of suspect data rules and a plurality of velocity rules.

12. The method of claim 11 wherein the plurality of suspect data rules comprise:
comparison of a shipping address with a directory of known real addresses;
comparison of a shipping address with a list of addresses implicated in prior possibly fraudulent transactions;
comparison of a billing address with a directory of known real addresses; and
comparison of a billing address with a list of addresses implicated in prior possibly fraudulent transactions.

13. The method of claim 11 wherein the plurality of velocity rules comprise:
determining whether a first number of transactions involving the seller exceeds a first predefined threshold for a first predefined time period;
determining whether a second number of transactions involving the buyer exceeds a second predefined threshold for a second predefined time period;
determining whether a first total dollar amount for a first plurality of transactions involving the buyer exceeds a third predefined threshold for a third predefined time period;

determining whether a second total dollar amount for a second plurality of transactions involving the seller exceeds a fourth predefined threshold for a fourth predefined time period;

determining whether a third total dollar amount for a specified financial account exceeds a fifth predefined threshold for a fifth predefined time period; and determining whether a third number of transactions involving the specified financial account exceeds a sixth predefined threshold for a sixth predefined time period.

14. The method of claim 11 wherein the plurality of velocity rules comprise:

determining whether a financial account specified as part of the payment information has exceeded a predetermined acceptable number of times used over a predetermined period of time;

determining whether a financial account specified as part of the payment information has exceeded a predetermined acceptable number of times used over a predetermined number of transactions with the seller; and determining whether a financial account specified as part of the payment information has exceeded a predetermined acceptable number of times used over a predetermined number of transactions with the payment facilitator.

15. The method of claim 1 wherein communicating an enhanced transaction information comprises sending an email message to at least one of a plurality of human fraud investigators.

16. The method of claim 1 further comprising:

if the analyzing indicates fraud, notifying the buyer and/or a seller that the payment transaction is on hold pending the outcome of a fraud investigation.

17. The method of claim 16 wherein notifying comprises: sending an email message to the buyer and/or the seller.

18. A system comprising:

a first computer supporting communications over a wide area network by a buyer, wherein the communications over the wide area network occur via a web site interface for a payment facilitator;

a second computer supporting communications over the wide are network by a seller, wherein the communications over the wide area network occur via the web site interface for the payment facilitator;

the payment facilitator computer supporting communications over the wide are network and executing software that facilitates a payment transaction between the buyer and the seller, wherein the facilitator computer is to receive payment information from the buyer and to analyze the payment transaction for fraud by applying a plurality of rules and incrementing a score for the payment transaction for each of the plurality of rules that is violated, if the score does not exceed a predefined threshold, instructs the seller via email to send a purchased product to the buyer, credits an account of the seller for the payment transaction in response to an email indication from the buyer that the buyer received the purchased product, and the payment facilitator directly contacts a financial institution associated with the buyer, via a dedicated line, and debits another account associated with the buyer at that financial institution and when the financial institution requests additional information from the payment facilitator before determining whether fraud exists the payment facilitator automatically issues email messages to the buyer or the seller requesting information to clarify requests of the financial institution and again attempts to obtain approval from the financial institution with the clarifying information before debiting the account of the buyer with the financial institution, and if the score exceeds a predefined threshold, communicates an information about the payment transaction to a human fraud investigator, and wherein a number of the rules are applied in response to information related to historical information that compliments the rules.

19. The system of claim 18 further comprising:

a fourth computer capable of communications with the third computer and allowing the human fraud investigator to communicate with the third computer.

20. The system of claim 19 wherein the third computer is coupled to the fourth computer via a dedicated communications line.

21. The system of claim 19 wherein the third computer communicates with the fourth computer over the wide area network.

22. The system of claim 18 further comprising:

a fifth computer capable of communications with the third computer and responding on behalf of the financial institution to a request for authorization of the payment transaction initiated by the software executing on the third computer.

23. The system of claim 22 wherein the third computer is coupled to the fifth computer via a dedicated communications line.

24. The system of claim 22 wherein the third computer communicates with the fifth computer over the wide area network.

25. The system of claim 18 wherein the wide area network is the Internet.

26. A machine readable medium having stored thereon instructions which when executed by a processor cause the machine to perform a method for detecting fraud by a payment facilitator when facilitating a payment transaction over a global wide area network, the method comprising:

receiving, via a web site interface of the payment facilitator, sale information pertaining to a purchase of a product from a seller, and wherein the sale information includes an email address for the seller;

receiving, via the web site interface of the payment facilitator, payment information from a buyer, and wherein the payment information includes an email address for the buyer;

performing, by the payment facilitator, automated analysis of transaction information including the sale information and the payment information to detect whether the transaction information indicates fraud, and wherein the payment facilitator acquires at least some information related to historical information, in order to determine if fraud is present;

if the automated analysis does not detect fraud, the payment facilitator sends information via email instructing the seller to send the product to the buyer, credits an account of the seller for the purchase in response to an email indication that the buyer received the product, and the payment facilitator directly contacts a financial institution associated with the buyer, via a dedicated line, and debits another account associated with the buyer at that financial institution;

when the financial institution requests additional information from the payment facilitator before determining whether fraud exists the payment facilitator automatically issues email messages to the buyer or the seller requesting information to clarify requests of the financial institution and again attempts to obtain approval from the financial institution with the clarifying information; and if the automated analysis detects fraud, the payment facilitator causes an enhanced transaction information to be communicated to a human for manual fraud analysis.

27. The machine readable medium of claim 26 wherein the instructions cause the machine to perform operations further comprising:

performing simple screening of the transaction information.

28. The machine readable medium of claim 27 wherein performing simple screening comprises:

determining whether a financial account specified as part of the payment information is on a list of known fraudulent financial account numbers;

determining whether the name of the buyer or the name of the seller is on a list of known fraudulent users;

determining whether a shipping address specified as part of the payment information is on a list of known fraudulent addresses;

determining whether a billing address specified as part of the payment information is on a list of known fraudulent addresses;

determining whether an email address of the buyer or the seller is on a list of known fraudulent email addresses; and determining whether an Internet protocol (IP) address of the buyer or the seller is on a list of known fraudulent IP addresses.

29. The machine readable medium of claim 26 wherein the instructions cause the machine to perform operations further comprising:

seeking approval from the financial institution based on the payment information.

30. The machine readable medium of claim 29 wherein seeking approval comprises:

sending a request for approval that comprises at least an account information extracted from the payment information and an amount information to a financial institution;

receiving from the financial institution a response to the request;

rejecting the payment transaction or continuing with the payment transaction responsive to the response.

31. The machine readable medium of claim 26 wherein performing automated analysis comprises:

performing rule-based analyses.

32. The machine readable medium of claim 31 wherein performing rule-based analyses comprises:

applying a plurality of rules to the transaction information such that a score for the payment transaction is incremented when one of the rules is violated.

33. The machine readable medium of claim 32 wherein performing rule-based analyses further comprises:

creating the enhanced transaction information if the score exceeds a predefined threshold such that the enhanced transaction information comprises a tracking number, the score, and a violated rule information.

34. The machine readable medium of claim 32 wherein applying comprises:

incrementing the score responsive to a numeric value assigned to the rule violated.

35. The machine readable medium of claim 32 wherein the plurality of rules comprise at least one of a plurality of suspect data rules and a plurality of velocity rules.

36. The machine readable medium of claim 26 wherein communicating an enhanced transaction information comprises sending an email message to at least one of a plurality of human fraud investigators.

37. The machine readable medium of claim 26 wherein the instructions cause the machine to perform operations further comprising:

if the analyzing indicates fraud, notifying the buyer and/or a seller that the payment transaction is on hold pending the outcome of a fraud investigation.

38. The machine readable medium of claim 37 wherein notifying comprises:

sending an email message to the buyer and/or the seller.

* * * * *

UNITED STATES PATENT AND TRADEMARK OFFICE
CERTIFICATE OF CORRECTION

PATENT NO. : 7,610,216 B1  Page 1 of 1
APPLICATION NO. : 09/615638
DATED : October 27, 2009
INVENTOR(S) : Jason May et al.

It is certified that error appears in the above-identified patent and that said Letters Patent is hereby corrected as shown below:

In column 15, line 65, in Claim 18, delete "exists" and insert -- exists, --, therefor.

In column 16, line 66, in Claim 26, delete "exists" and insert -- exists, --, therefor.

Signed and Sealed this

Twenty-sixth Day of January, 2010

David J. Kappos
*Director of the United States Patent and Trademark Office*